(12) United States Patent
Vidra

(10) Patent No.: US 10,055,755 B2
(45) Date of Patent: Aug. 21, 2018

(54) TARGETING CONTENT BASED ON RECEIPT OF PARTIAL TERMS

(75) Inventor: Ezequiel Vidra, London (GB)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 13/602,378

(22) Filed: Sep. 4, 2012

(65) Prior Publication Data

US 2013/0232167 A1  Sep. 5, 2013

(30) Foreign Application Priority Data

Mar. 1, 2012  (IL) .......................................... 218420

(51) Int. Cl.
*G06Q 30/02* (2012.01)
*G06F 17/30* (2006.01)

(52) U.S. Cl.
CPC ... *G06Q 30/0251* (2013.01); *G06F 17/30672* (2013.01); *G06F 17/30864* (2013.01); *G06Q 30/0275* (2013.01)

(58) Field of Classification Search
CPC .................................................. G06Q 30/0251
See application file for complete search history.

(56) References Cited

U.S. PATENT DOCUMENTS

| 7,933,798 B1* | 4/2011 | Yan et al. ................... 705/14.45 |
| 8,005,919 B2 | 8/2011 | Mehanna et al. |
| 8,224,689 B1* | 7/2012 | Sandberg et al. ............ 705/7.35 |
| 8,265,990 B2* | 9/2012 | Penberthy et al. ........... 705/14.1 |
| 2003/0055816 A1* | 3/2003 | Paine et al. ........................ 707/3 |
| 2005/0060294 A1* | 3/2005 | Rainey ............................... 707/3 |
| 2005/0149397 A1* | 7/2005 | Morgenstern et al. .......... 705/14 |
| 2005/0256766 A1* | 11/2005 | Garcia .............. G06F 17/30241 705/14.54 |
| 2007/0255693 A1 | 11/2007 | Ramaswamy et al. |
| 2008/0109401 A1 | 5/2008 | Sareen et al. |
| 2009/0299998 A1* | 12/2009 | Kim ..................................... 707/5 |
| 2010/0094860 A1* | 4/2010 | Lin et al. ....................... 707/709 |
| 2010/0215645 A1* | 8/2010 | Cargill ................. C12Q 1/6883 424/130.1 |

(Continued)

OTHER PUBLICATIONS

PredictAd "Add a search completion add-on to your toolbar or software" [online] Retrieved from the Internet: http://www.predictad.com/home/SoftwareAndUserApplication.aspx [retrieved on Aug. 27, 2012] 2 pages.

(Continued)

*Primary Examiner* — Ashish K Thomas
*Assistant Examiner* — Mellissa M Ohba
(74) *Attorney, Agent, or Firm* — Fish & Richardson P.C.

(57) ABSTRACT

Methods, systems, and computer program products target content to users based on receipt of partial terms. One or more terms associated with a campaign are identified, the campaign having an associated content item that is presented to users responsive to requests for content. A campaign sponsor is presented with an option to target the content item to users based on receipt of a partial form of one of the one or more terms. A selection of a designation of the partial form of the term is received from the content sponsor for use in targeting. The content item is optionally presented in a search suggestion control along with search completions in response to receipt of the partial form of the term in a search control.

16 Claims, 7 Drawing Sheets

(56) References Cited

U.S. PATENT DOCUMENTS

| | | | | |
|---|---|---|---|---|
| 2011/0258049 A1* | 10/2011 | Ramer | ............. | G06F 17/30867 705/14.66 |
| 2012/0047005 A1* | 2/2012 | Connelly et al. | ............ | 705/14.4 |
| 2012/0209705 A1* | 8/2012 | Ramer | ............. | G06F 17/30867 705/14.51 |
| 2012/0209706 A1* | 8/2012 | Ramer | ............. | G06F 17/30867 705/14.51 |
| 2012/0209707 A1* | 8/2012 | Ramer | ............. | G06F 17/30867 705/14.51 |
| 2012/0209708 A1* | 8/2012 | Ramer | ............. | G06F 17/30867 705/14.51 |
| 2012/0209709 A1* | 8/2012 | Ramer | ............. | G06F 17/30867 705/14.51 |
| 2012/0209710 A1* | 8/2012 | Ramer | ............. | G06F 17/30867 705/14.51 |
| 2012/0215602 A1* | 8/2012 | Ramer | ............. | G06F 17/30867 705/14.13 |
| 2012/0215612 A1* | 8/2012 | Ramer | ............. | G06F 17/30867 705/14.23 |
| 2012/0215622 A1* | 8/2012 | Ramer | ............. | G06F 17/30867 705/14.44 |
| 2012/0215623 A1* | 8/2012 | Ramer | ............. | G06F 17/30867 705/14.44 |
| 2012/0215624 A1* | 8/2012 | Ramer | ............. | G06F 17/30867 705/14.44 |
| 2012/0215625 A1* | 8/2012 | Ramer | ............. | G06F 17/30867 705/14.44 |
| 2012/0215626 A1* | 8/2012 | Ramer | ............. | G06F 17/30867 705/14.44 |
| 2012/0215635 A1* | 8/2012 | Ramer | ............. | G06F 17/30867 705/14.51 |
| 2012/0215639 A1* | 8/2012 | Ramer | ............. | G06F 17/30867 705/14.53 |
| 2012/0215640 A1* | 8/2012 | Ramer | ............. | G06F 17/30867 705/14.55 |

OTHER PUBLICATIONS

PredictAd "Publisher Signup" [online] Retrieved from the Internet: http://www.predictad.com/home/PublisherSignup.aspx [retrieved on Aug. 27, 2012] 2 pages.

PredictAd "Search completion tool for your site search" [online] Retrieved from the Internet: http://www.predictad.com/home/publisherinfor.aspx [retrieved on Aug. 27, 2012] 2 pages.

PredictAd "PredictAd—Enhance search, Spread your content and get powerful analytics for your web" [online] Retrieved from the Internet: http://www.predictad.com/home/default.aspx. [retrieved on Aug. 27, 2012] 2 pages.

PredictAd "Start Advertising" [online] Retrieved from the Internet: http://www.predictad.com/home/AdvertiserSignup.aspx [retrieved on Aug. 27, 2012] 2 pages.

PredictAd "Advertise with PredictAd" [online] Retrieved from the Internet: http://www.predictad.com/home/AdvertiserInfo.aspx [retrieved on Aug. 27, 2012] 2 pages.

Collarity—Optimized audience Engagement—Screenshots Retrieved from the Internet: http://www.collarity.com/resources/screenshots.html [retrieved on Aug. 27, 2012] 2 pages.

\* cited by examiner

Campaign Keywords

Campaign Parameters

Targeting:
All available sites  Edit
Mobile devices  Edit
English  Edit
San Francisco  Edit
⎫
⎬ 402
⎭

Bids:
Default bid: $0.25  } 404

Edit Keywords
— 408

| | Max CPC | Impressions | Clicks |
|---|---|---|---|
| example | $0.35 | 1288 | 55 |
| example motors | $0.25 | 779 | 23 |
| example automobiles | $0.25 | 41 | 2 |
| example autos | $0.25 | 33 | 1 |

— 410
Broad match
Exact match
Phrase match
✓ Partial match

Broad match

Save ⤴ 412

TARGETING CONTENT BASED ON RECEIPT OF PARTIAL TERMS

CROSS-REFERENCE TO RELATED APPLICATIONS

Pursuant to 35 U.S.C. § 119, this application claims the benefit of a foreign priority of Israel Patent Application No. 218420, filed Mar. 1, 2012, whose disclosure content is hereby incorporated by reference in its entirety.

BACKGROUND

This specification generally relates to information presentation.

Users can employ Internet-based search engine interfaces to provide search queries and to receive query results. Content providers can target specific search query keywords, and can sponsor content to be provided to users along with the query results. Some search engines may include predictive capabilities for presenting users with query suggestions, based on characters entered in a search box.

SUMMARY

In general, one innovative aspect of the subject matter described in this specification may be embodied in methods, systems, and computer program products for targeting content to users based on receipt of partial terms. One example method includes identifying one or more terms associated with a campaign, the campaign having an associated content item that is presented to users responsive to requests for content, presenting a campaign sponsor with an option to target the content item to users based on receipt of a partial form of one of the one or more terms, receiving from the campaign sponsor a selection of a designation of the partial form of the term for use in targeting, and optionally presenting the content item in a search suggestion control along with search completions in response to receipt of the partial form of the term in a search control.

Another example method includes receiving targeting criteria for a campaign, the campaign including an associated content item that is to be provided in response to a content item request, wherein the targeting criteria includes a designation of one or more partial search terms, associating a bid with each partial search term, receiving in a search control a partial query, the partial query being entered by a user though not completed by the user, determining whether the partial query matches the partial search terms associated with the campaign, and providing the content item in response to receipt of the partial query.

In general, another innovative aspect of the subject matter described in this specification may be embodied in computer program products that can perform operations including identifying one or more terms associated with a campaign, the campaign having an associated content item that is presented to users responsive to requests for content, presenting a campaign sponsor with an option to target the content item to users based on receipt of a partial form of one of the one or more terms, receiving from the campaign sponsor a selection of a designation of the partial form of the term for use in targeting, and presenting the content item in a search suggestion control along with search completions in response to receipt of the partial form of the term in a search control.

In general, another innovative aspect of the subject matter described in this specification may be embodied in content management systems for serving sponsored content to users. The systems can include keyword identifiers, targeting option providers, targeting selection receivers, keyword receivers, and content item providers. A keyword identifier can identify one or more terms associated with a campaign, the campaign having an associated content item that is presented to users responsive to requests for content. A targeting option provider can present a campaign sponsor with an option to target the content item to users based on receipt of a partial form of one of the one or more terms. A targeting selection receiver can receive from the campaign sponsor a selection of a designation of the partial form of the term for use in targeting. A keyword receiver can receive the partial form of the term. A content item provider can present the content item along with suggested search completions.

These and other embodiments may each optionally include none, one or more of the following features. Identifying one or more terms can includes receiving the one or more terms from the campaign sponsor. Presenting the campaign sponsor with an option can include presenting the campaign sponsor a control for selecting one or more partial forms for targeting. Presenting the campaign sponsor a control can include presenting suggestions for partial forms for targeting. Presenting the campaign sponsor a control can include presenting estimated reach information for each partial form suggested. Receiving the selection can include receiving a bid to be associated with the partial form of the term. The partial form can include the first letter of the term. The partial form can include the first few letters of the term. The partial form can be a word in a phrase. The partial form in the content item can be highlighted when presenting the content item to users. An auction can be conducted for all campaigns that targeted the partial search terms, including evaluating bids and associated quality scores for the campaign and presenting a content item from one or more winning campaigns in a search suggestion control responsive to receipt of the partial query.

Particular embodiments of the subject matter described in this specification may be implemented to realize none, one or more of the following advantages. Campaign sponsors may employ online interfaces to evaluate various targeting options regarding partial keyword forms, and to make appropriate targeting decisions based on the circumstances of their particular campaigns. Campaign sponsors may increase their potential exposure to users. System users may receive sponsored content suggestions based on the submission of a minimal number of keystrokes, or a single keystroke, improving system response times and content relevance for users.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3 and 4 show example user interfaces for presenting campaign sponsors with options for targeting content items to users based on receipt of partial terms.

Like reference symbols in the various drawings indicate like elements.

DETAILED DESCRIPTION

In general, computer systems can provide targeted content based on receipt of partial terms. Users can interact with a search engine interface (e.g., a web page) to provide queries via a search control (e.g., a search box). Search disambiguation may occur as the user types his or her query, for example, by presenting the user with query completion options within a search suggestions control (e.g., a search suggestions box). In addition to providing query completion options, one or more content items (e.g., advertisements) may be provided in the search suggestions control. Campaign sponsors (e.g., advertisers) may be given the option to target content items to users, based on partial term forms provided by users.

Figure 1:
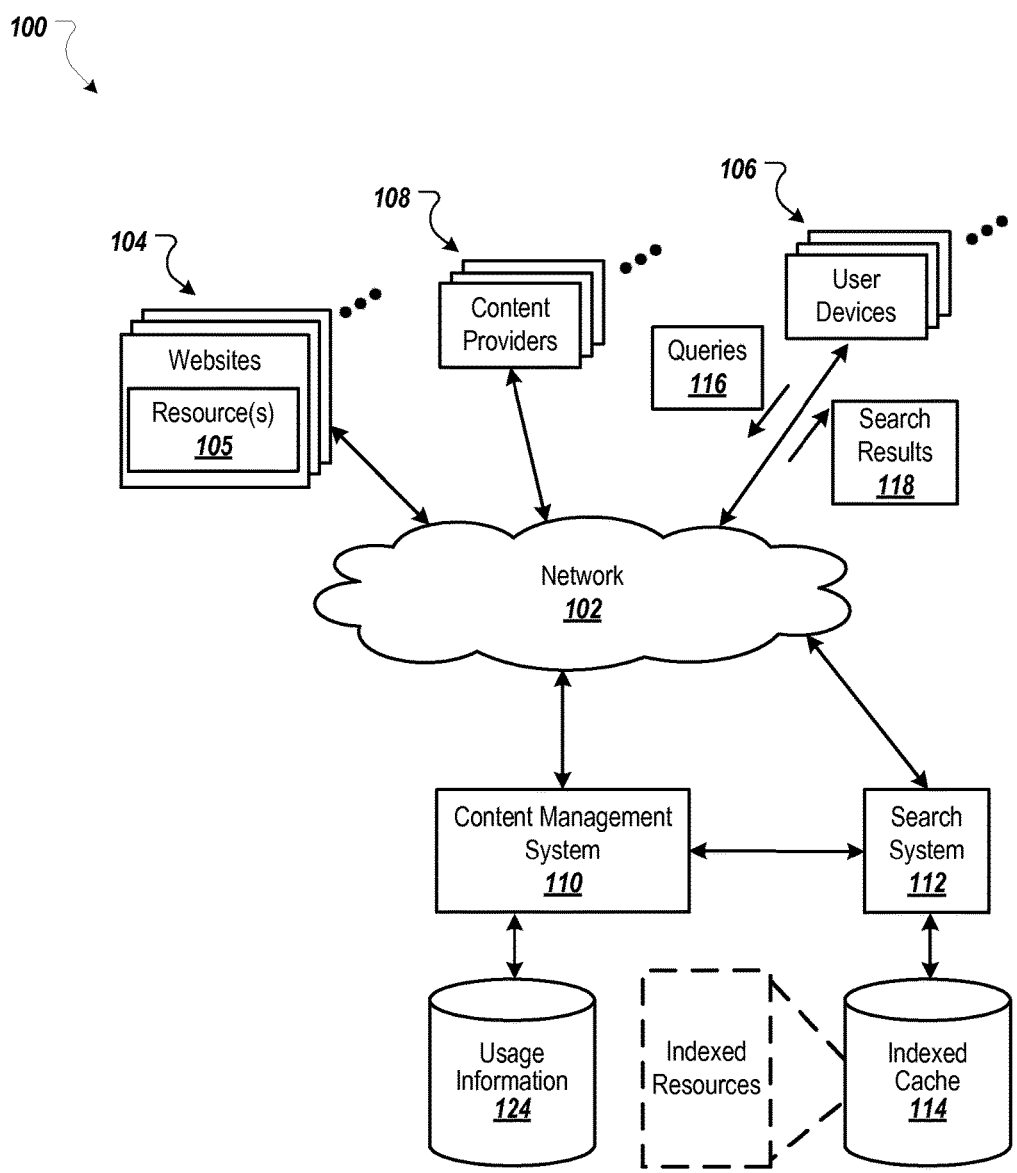
FIG. 1 is a block diagram of an example environment for presenting content to users in response to requests for content.

FIG. 1 is a block diagram of an example environment 100 for providing content to users in response to requests for content. The example environment 100 includes a network 102, such as a local area network (LAN), a wide area network (WAN), the Internet, or a combination thereof. The network 102 connects websites 104, user devices 106, content providers 108 (e.g., advertisers), publishers, and a content management system 110. The example environment 100 may include many thousands of websites 104, user devices 106, and content providers 108. The content management system 110 may be used for selecting and providing content in response to requests for content.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102. A request for a resource 105 or a search query 116 sent from a user device 106 can include an identifier, such as a cookie, identifying the user of the user device 106.

In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The content information system 110 can update usage information 124 for a user, based on activity of the user, subject to the user's express permission. For example, the user may receive notice of what data may be collected and how such data may be used or retained, and may be provided with an opportunity to opt in/out of programs that may collect personalized information. In addition, certain data may be anonymized in one or more ways before it is stored or used, so that personally identifiable data is removed. The usage information 124 can include, for example, information about past user activities, such as past requests for resources 105, past search queries 116, other requests for content, websites visited, or interactions with content. In some implementations, the usage information 124 can be derived, for example, from one or more of a query log, an advertisement log, or requests for content. In some implementations, the usage information 124 can include, for each entry, a cookie identifying the user, a timestamp, an IP (Internet Protocol) address associated with a requesting user device 106, a type of usage, and details associated with the usage.

When a resource 105 or search results 118 are requested by a user device 106, the content management system 110 may receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or web page, in which content can be presented. An example slot is an ad slot. Search results pages can also include one or more slots in which other content items (e.g., ads) can be presented.

Information about slots can be provided to the content management system 110. For example, a reference (e.g., URL) to the resource for which the slot is defined, a size of the slot, and/or media types that are available for presentation in the slot can be provided to the content management system 110. Similarly, keywords or portions of keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords (or portions of keywords) or search queries 116. As another example, content items having targeting keywords that match the resource keywords (or portions thereof) or the search query 116 are selected as eligible content items by the content management system 110.

A targeting keyword can match a resource keyword or a search query 116 by having the same textual content ("text") as the resource keyword or search query 116. For example, a content item (e.g., an advertisement) associated with the targeting keyword "automobiles" can be an eligible content item (or an eligible ad) for a content item request that includes the resource keyword "automobiles." Similarly, the ad can be selected as an eligible content item for a request including the search query "automobiles." Moreover, partial keyword forms may be considered when matching targeting keywords with resource keywords or search queries. For example, a content item associated with a partial form of a targeting keyword (e.g., the letter "a", the partial form "au", the partial form "aut", etc.) can be selected as an eligible content item for a request including similar partial resource keywords or partial search queries.

The content management system 110 can select from the eligible content items that are to be provided for presentation in slots of a resource 105 or search results page 118 based at least in part on results of an auction. For example, for the eligible content items, the content management system 110 can receive bids from content providers 108 (e.g., advertisers) and allocate the slots, based at least in part on the received bids (e.g., based on the highest bidders at the conclusion of the auction). The bids are amounts that the content providers are willing to pay for presentation (or selection) of their content with a resource 105 or search results page 118. For example, a bid can specify an amount that a content provider is willing to pay for each one thousand impressions (i.e., presentations) of the content item, referred to as a CPM bid. Alternatively, the bid can specify an amount that the content provider is willing to pay for a selection (i.e., a click-through) of the content item or a conversion following selection of the content item. The selected content item can be determined based on the bids alone, or based on the bids of each bidder being multiplied by one or more factors, such as quality scores derived from content performance, landing page scores, and/or other factors.

Figure 2:
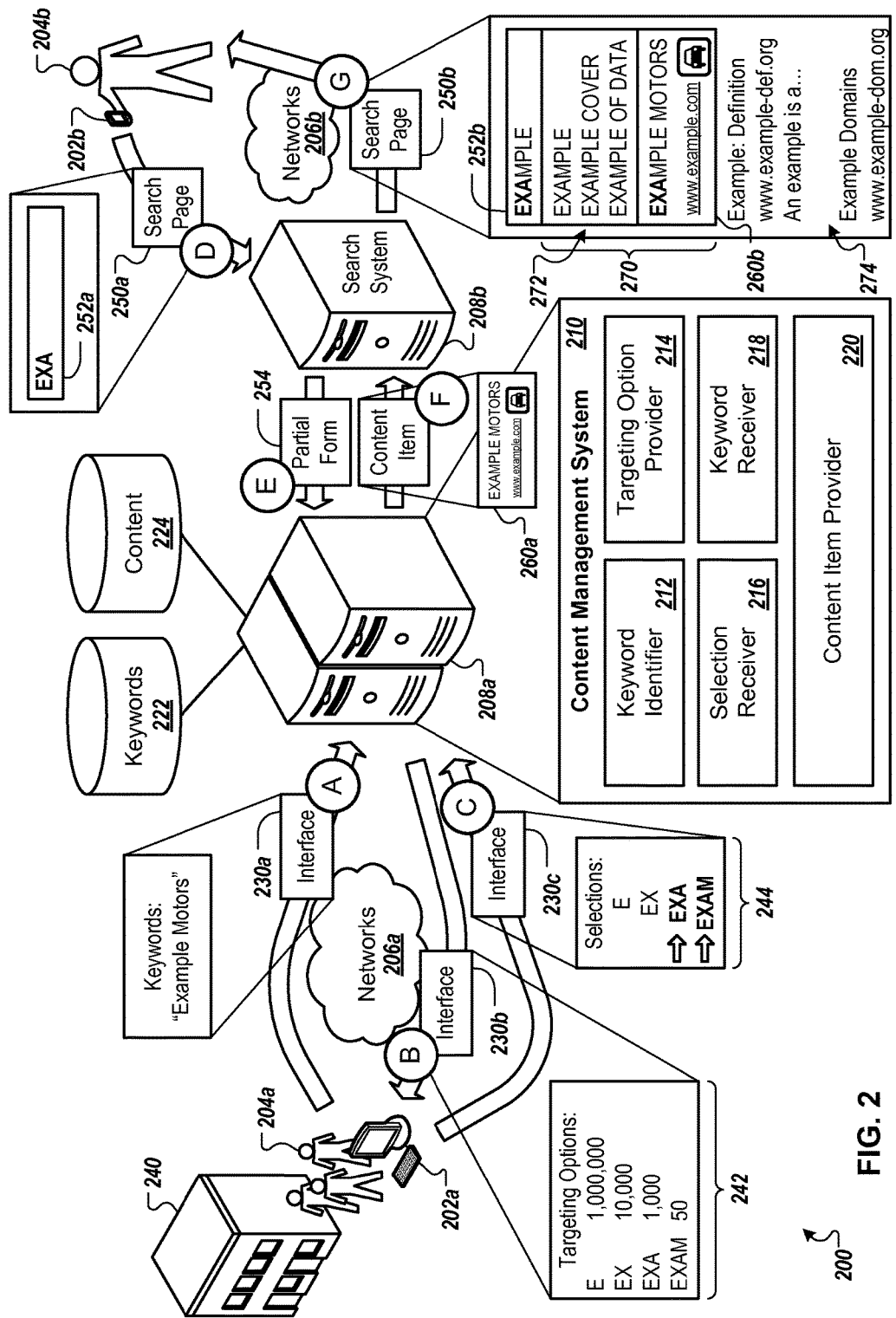
FIG. 2 is a diagram of an example system that can target content items to users based on receipt of partial terms.

FIG. 2 is a diagram of an example system 200 that can target content items to users based on receipt of partial terms (e.g., keywords). FIG. 2 also illustrates an example flow of data within the system 200 during states (A) to (G), where the states (A) to (G) may occur in the illustrated sequence, or they may occur in a sequence that is different than in the illustrated sequence. For example, two or more of the states (A) to (G) may occur concurrently.

The system 200 can provide suggestions, for instance, as completions in the form of multi-term phrases or dominant queries that are derived from the received user input. For example, a content management system 210 included in the system 200 can evaluate the user input as received and identify one or more completions based on the user input. Based on the completions, one or more associated content items can be identified. Ones of the completions (e.g., popular ones) can be provided as suggestions to the user. The additional content items can be merged with selected ones of the completions and provided for display to the user. The suggestions can be displayed in proximity to or in an augmented form of the control that receives the user input. For example, the suggestions and associated content can be included in an answer box that is displayed in proximity to the control (e.g., a search query box). In some implementations ads, navigational links, static content, video content, or other content can be displayed in an answer box adjacent to (e.g., directly below) an input control (e.g., a search query box) on the user's computer screen. The suggestions and additional content items can appear on the user's screen in an answer box or other form of display element after the user has entered just a portion (e.g., a character, a few characters, etc.) of the query, such as after the input is sufficient to generate useful suggestions. In some implementations, one or more content items are provided along with one or more suggestions for completing the user input. The content items can be included along with the suggestions or presented in a separate augmented form of the control (e.g., expanded textual input box or drop down box).

For the purposes of this disclosure, the user input received and processed to determine suggestions and related content is referred to herein as a prefix. The prefix can constitute one or more textual characters that are entered by/received from the user. A completion refers to a particular completed request, and can be based on historical processing of other requests. For example, a completion can be of the form of words or phrases that embody the request the user is providing, as evaluated as a portion of that request is entered. In some implementations, the suggestions and/or additional content (e.g., advertisements) returned by the content management system 210 can correspond to content exactly matching the prefix entered by the user. For example, if the user enters "bicyc", the system 200 can generate suggestions and locate additional content items related to the subject of bicycles, such as suggestions for ads for local bicycle shops. In some implementations, the information returned by the content management system 210 can be based on the user's interests, profile information, geographical location, etc. These additional criteria can be combined for use with the user's input in order to provide targeted content.

The system 200 can include one or more client devices 202 (each operated by a corresponding device user 204) that communicate over one or more networks 206 with one or more computing servers 208. The networks 206 may include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

The client device(s) 202 may be any suitable type of computing device (e.g., mobile phone, smartphone, personal digital assistant, tablet computer, laptop or desktop computer, or other stationary or portable device) that includes one or more processors and computer readable media. Among other components, for example, the client device(s) 202 includes one or more processors, computer readable media that store software applications, input device(s) (e.g., touch screens, keyboards, computer mice, motion sensors, microphones, etc.), output device(s) (e.g., display screens, speakers, etc.), and communications interfaces.

The computing server(s) 208 may be configured to execute application code associated with a variety of software components (e.g., modules, objects, libraries, services, etc.), including computer instructions to perform some or all of the method steps described below. In some implementations, the computing server 208a may include one or more components of the content management system 210 described below.

The content management system 210 (e.g., similar to the content management system 110, shown in FIG. 1) can identify keywords associated with a campaign, can present a campaign sponsor with an option to target one or more content items to users based on receipt of a partial form of one or more terms (e.g., keywords), and can provide the content items to users for presentation. In the present example, the content management system 210 includes a keyword identifier 212, a targeting option provider 214, a selection receiver 216, a keyword receiver 218, and a content item provider 220. Two or more of the components 212, 214, 216, 218, and 220 may be implemented on the same device (e.g., same computing device), or on different devices, such as devices included in a server farm or a peer-to-peer network.

The content management system 210 may be in communication with one or more data stores, servers, and/or other systems. In the present example, the content management system 210 and server(s) 208a communicates with a keywords data store 222, a content data store 224, and the server(s) 208b (e.g., servers for running a search system, similar to the search system 112 shown in FIG. 1). The data stores 222, 224, for example, can implement databases, file systems, and the like to add, remove, and maintain data used by the system 200. The server(s) 208b (the search system), for example, can receive search queries from and can provide search results to system users (e.g., the user 204b).

Referring to the example flow of data, during state (A), campaign sponsors can provide one or more keywords associated with a campaign. Campaigns, for example, may include actions for reaching users, or particular categories (e.g., based on user demographics, locations, and/or profiles) of users. Campaign sponsors, for example, may include entities (e.g., organizations, businesses, individuals, etc.) that intend to target content items (e.g., advertisements) to system users (e.g., the user 204b) during one or more campaigns.

In the present example, to provide one or more campaign keywords to the content management system 210, the user 204a can employ the client device 202a to interact with an interface 230 (shown here as interface 230a). The user 204a, for example, may be a representative, agent, and/or employee of campaign sponsor 240 (e.g., "Example Motors", an automobile dealership). The interface 230, for example, may be an online interface (e.g., a web page) provided by the content management system 210, and may include various controls (e.g., output, input, command, etc.) for presenting information to and receiving information from campaign sponsors via networks 206a, to facilitate campaign configuration and management by the sponsors.

In the present example, using the interface 230a, the user 204a (e.g., a representative of campaign sponsor 240) provides the keyword phrase "Example Motors" to the content management system 210. Upon receiving the keyword phrase, for example, the content management system 210 can employ the keyword identifier 212 to identify one or more keywords (e.g., "example", "motors") included in the phrase. As another example, upon receiving identification information from the campaign sponsor 240, the content management system 210 can identify keywords associated with the sponsor from the keywords data store 222, and can identify associated content items (e.g., including text, images, video, audio, web links, etc.) from the content data store 224.

During state (B), campaign sponsors can be presented with options to target content items to users based on receipt of partial forms of one or more keywords. For example, the content management system 210 can employ the targeting option provider 214 to provide one or more targeting options 242 to the user 204a (e.g., a representative of campaign sponsor 240) via the interface 230 (shown here as interface 230b). The targeting options 242, for example, may include one or more partial form suggestions, and estimated reach information for each partial form suggested, based on the identified keywords. In the present example, the targeting options 242 for the identified keyword "example" includes various partial forms of the keyword, including the letter "e" (with an estimated reach of one million impressions), the letters "ex" (with an estimated reach of ten thousand impressions), the letters "exe" (with an estimated reach of one thousand impressions), and the letters "exam" (with an estimated reach of fifty impressions).

In general, partial keyword forms with few letters may have greater estimated reach (and thus, may be more expensive in a bidding environment) than partial keyword forms with many letters. However, partial keyword forms with many letters may be considered by campaign sponsors as having greater potential for targeting than partial keyword forms with few letters. Thus, potential trade-offs may exist between various keyword forms. Campaign sponsors may employ the interface 230, for example, to evaluate various targeting options, and to make suitable targeting decisions based on their preferences and on the circumstances of their particular campaigns. Detailed examples of the interface 230 are presented below (refer to FIGS. 3 and 4).

During state (C), selections of designations of partial keyword forms can be received from campaign sponsors. For example, the user 204a (e.g., a representative of campaign sponsor 240) can use the interface 230 (shown here as interface 230c) to indicate one or more partial keyword selections 244 (e.g., the partial forms "exa" and "exam"). Upon receiving the selections, for example, the content management system 210 can employ the selection receiver 216 to associate the selections 244 with a campaign of the campaign sponsor 240. For example, the selections 244 may be maintained by the keywords data store 222 in association with one or more campaign identifiers. Moreover, one or more content items associated with the campaign (e.g., content items such as advertisements maintained by the content data store 224) may be associated with the selections 244.

During state (D), system users can submit requests for content. Requests for content, for example, may include search queries, map requests, social network requests, and other sorts of content requests. Requests may be submitted, for example, by providing text (e.g., by typing), voice commands, images (e.g., photos), and other appropriate mechanisms. In the present example, the user 204b can employ the client device 202b to access a search page 250 (shown here as search page 250a) provided by the server(s) 208b (the search system) via networks 206b. Interacting with the search page 250a, for example, the user 204b can enter search text in a search control 252 (shown here as search control 252a). The user 204b in the present example begins entering text (e.g., via keypad), including a prefix (i.e., a sequence of letters) "exa". As the user enters the sequence of letters, for example, the search page 250a can provide the sequence to the server(s) 208b. Upon receiving the sequence, for example, the server(s) 208b (the search system) may recognize a partial form 254 (e.g., "exa") of a term (e.g., a keyword), and may provide the partial form 254 to the content management system 210.

During state (E), partial forms of keywords can be received. For example, the content management system 210 can employ the keyword receiver 218 to receive the partial form 254 (e.g., "exa") from the server(s) 208b (the search system). Upon receiving the partial form 254, for example, the content management system 210 can reference the keywords data store 222 to identify one or more campaign sponsors and/or campaigns that are associated with the partial form. In the present example, the content management system 210 may determine that the campaign sponsor 240 is associated with the partial form 254, and is associated with content to be provided to users in response to receipt of the partial form. The content item provider 220, for example, can reference the content data store 224 or another suitable content source, and can provide a content item 260 (shown here as content item 260a) to the server(s) 208b. Content items, for example, may include text, images, video, audio, web links, and other types of content. In the present example, the content item 260 includes text (e.g., "Example Motors"), a web link (e.g., www.example.com), and a favicon (e.g., an automobile icon) associated with the campaign sponsor 240. If plural campaigns are identified, for example, then a selection (e.g., an auction or reservation selection) can be made to determine which among the plural eligible items should be delivered.

In some implementations, cached content-completion pairs may provide the basis for retrieving or generating content items. The system 200 can populate and update the content-completion pairs by querying ad mixers (not shown) in the background. For example, completions can be determined based on predictions of the most popular requests (e.g., search queries) received. One or more content items can be associated with each completion, forming pairs that are stored as ad-completion pairs. The actual content items or links thereto can be stored, for example, in the content data store 224. The content data store 224 can include references, for example, to keywords or other information associated with the content items (e.g., advertisements). Content-completion pairs can be indexed by completion, keywords associated with a completion, or other means. Which completions are associated with which content items (and hence mapped in the form of content-completion pairs) can be based on the frequency of previously performed searches. This provides the advantage of caching matching items that are generally more likely to lead to specific additional content that is useful to the user.

During state (F), content items can be presented to users. For example, the server(s) 208b (the search system) can include the content item 260 (shown here as content item 260b) in a search suggestion control 270 along with one or more search completions 272 (e.g., "example", "example cover", "example of data", etc.). The search suggestion control 270, for example, may be included in the search page 250 (shown here as search page 250b) with search results 274 for presentation to the user 204b via the client device 202b. The server(s) 208b, for example, may provide search results that are relevant to a primary search completion (e.g., "example"), and may update the search control 252 (shown here as search control 252b) to include the completed term(s).

Various embellishments may be provided to facilitate recognition of content items in search suggestion controls. In some implementations, a separation indicator (e.g., a line or another sort of boundary) may be included to provide a distinction between search completions and sponsored content items. Thus, users may readily determine which suggestions are sponsored, for example, and which are not. In some implementations, partial forms may be highlighted in content items when presenting content items to users. For example, the partial form "exa" may be highlighted within the text "Example Motors". Thus, if the user 204b happens to be interested in "Example Motors", for example, he or she may readily identify the entity via the highlighted text, web link, and/or favicon, and may interact with (e.g., click) the content item 260b to navigate his or her web browser to a website associated with the campaign sponsor 240.

Figure 3:
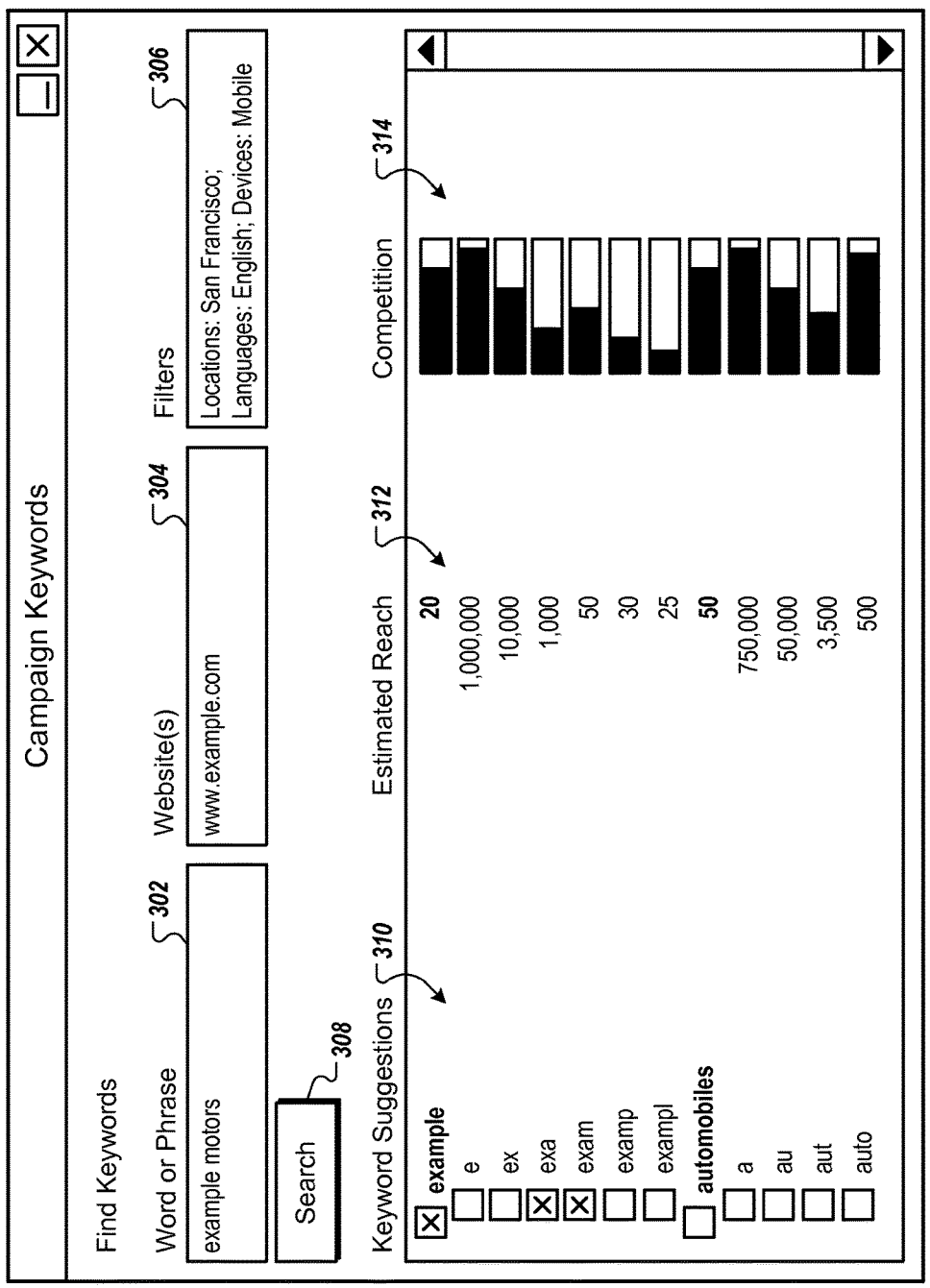

FIGS. 3 and 4 show example user interfaces 300 and 400, respectively, for presenting campaign sponsors with options for targeting content items to users based on receipt of partial terms. For example, the client device 202a (shown in FIG. 2) can execute an application such as a web browser to present one or more user interfaces such as the user interfaces 300, 400 to the user 204a (e.g., a representative of campaign sponsor 240). By interacting with user interfaces such as the user interfaces 300, 400, for example, representatives of the campaign sponsor 240 (also shown in FIG. 2) can designate partial term forms for use in targeting content items to system users.

Referring to FIG. 3, for example, the user interface 300 may include a control 302 for indicating one or more keywords or phrases, a control 304 for indicating one or more websites, and a control 306 for indicating one or more filters. For example, the campaign sponsor 240 may employ the user interface 300 to submit information such as keyword/phrase information, website information, and filter information to the content management system 210, and may in turn receive one or more suggestions for keywords and/or partial keyword forms for use in targeting content items to users during a campaign. In the present example, the campaign sponsor 240 can interact with (e.g., enter a value in) the control 302 to indicate the keyword phrase "example motors". Instead of or in addition to indicating keywords and/or phrases, for example, the campaign sponsor 240 can interact with the control 304 to indicate the website "www.example.com". By providing website information, for example, campaign sponsors may direct the content management system 210 toward resources (e.g., web pages) from which potential keywords to be used for targeting can be extracted. In the present example, the campaign sponsor 240 can also interact with the control 306 to indicate an interest in targeting content to users in San Francisco whose primary language is English and who employ mobile devices (e.g., smartphones). Upon indicating keyword/phrase, website, filter, and other suitable parameters, for example, the user can interact with (e.g., click) a control 308 to search for keyword and partial keyword suggestions and associated information.

Upon receiving one or more parameters via the user interface 300, for example, the content management system 210 can process the request for partial keyword suggestions. For example, the keywords and/or phrases submitted via the control 302 can be parsed and can be analyzed to identify individual keywords and common synonyms. As another example, websites submitted via the control 304 can be visited and can be analyzed to identify frequently used terms. Referring to FIG. 1, for example, the usage information 124 can be analyzed to identify the frequency of which keywords and partial keywords have been submitted by users (e.g., as part of a search query). Moreover, based on the filtering parameters submitted via the control 306, for example, estimated reach information for subsets of system users may be determined, such as users at particular locations, users of different languages, users who employ different sorts of client devices, and so forth. Moreover, based on past and current auctions for having content items provided to users, for example, competition information for various keywords and partial keywords may be determined.

Upon processing the request for partial keyword suggestions, for example, the content management system 210 can provide the campaign sponsor 240 with one or more keyword and partial keyword suggestions for targeting content items to system users, and can provide information associated with various keyword forms to facilitate selection. For example, the user interface 300 may include one or more controls 310 for selecting suggested keyword and/or partial keyword forms for targeting, one or more controls 312 for presenting estimated reach information for each of the keywords and partial keywords, and one or more controls 314 for presenting competition information for each of the keywords and partial keywords. Considering the suggested keyword "example", for example, partial keyword forms may be presented for each possible partial keyword, starting with the first keyword letter, followed by the first two keyword letters, etc. Thus, for the keyword "example", the partial keyword forms "e", "ex", "exa", "exam", "examp", and "example" may be suggested.

In some implementations, estimated reach information and competition information may be presented for each suggested keyword and partial keyword. In the present example, the keyword "example" may be associated with an estimated reach of twenty impressions (e.g., per hour, per day, per week, or another time period) and a high level of auction competition. Further, in the present example, the partial keyword "e" may be associated with an estimated reach of one million impressions, and a higher level of auction competition than that of the keyword "example". Based on estimated reach and/or competition information, for example, campaign sponsors may select one or more keywords and/or partial keywords for targeting. In the present example, the content sponsor may interact with (e.g., select via checkbox) the keyword "example", and the partial keyword forms "exa" and "exam", based on a preferable combination of estimated reach information, perceived targeting value, and/or favorable levels of competition.

Referring to FIG. 4, for example, the user interface 400 may include one or more controls 402 for specifying campaign targeting parameters, one or more controls 404 for specifying bid information (e.g., auction bid information) and one or more controls 406 for editing campaign keywords. For example, the campaign sponsor 240 may employ the user interface 400 to manage an existing campaign for targeting content items to system users. In the present example, the campaign sponsor 240 can interact with the control(s) 402 to indicate that a particular campaign is to target all available websites for users employing mobile devices (e.g., smartphones), whose primary language is English, and who are located in San Francisco. Moreover, in the present example, the campaign sponsor 240 can interact with the control(s) 404 to indicate a default bid of $0.25 for having content items presented to users in response to receipt of keywords and/or partial keyword forms.

Referring to the control(s) 406 for editing keywords, for example, a keyword 408 (e.g., "example") may be included for a particular campaign. Using a control 410, for example, the campaign sponsor 240 may select a type of matching to be performed when targeting content items to the keyword 408. Types of keyword matching, for example, may include broad matching (e.g., matching different word forms, such as plural/singular, verb tenses, etc.), exact matching, phrase matching (e.g., for phrases including multiple keywords), and partial matching. Moreover, the control(s) 406 may present additional information (e.g., maximum costs per click, numbers of impressions and/or clicks for particular periods of time, etc.) for each keyword, to facilitate selections of desired matching types. In the present example, the campaign sponsor 240 may indicate via the control 410 that partial forms of the keyword 408 (e.g., "example") are to be matched to partial forms provided by system users in association with requests for content (e.g., search queries). In some implementations, upon selecting the "partial match" option, the campaign sponsor 240 may be presented with possible partial forms for selection (refer to the control 310, shown in FIG. 3). In some implementations, all possible partial matches of the keyword 408 may be considered by the content management system 210. Upon modifying campaign parameters and/or keywords, for example, a representative of the campaign sponsor 240 can interact with (e.g., click) a control 412 to submit changes to the content management system 210.

Figure 5:
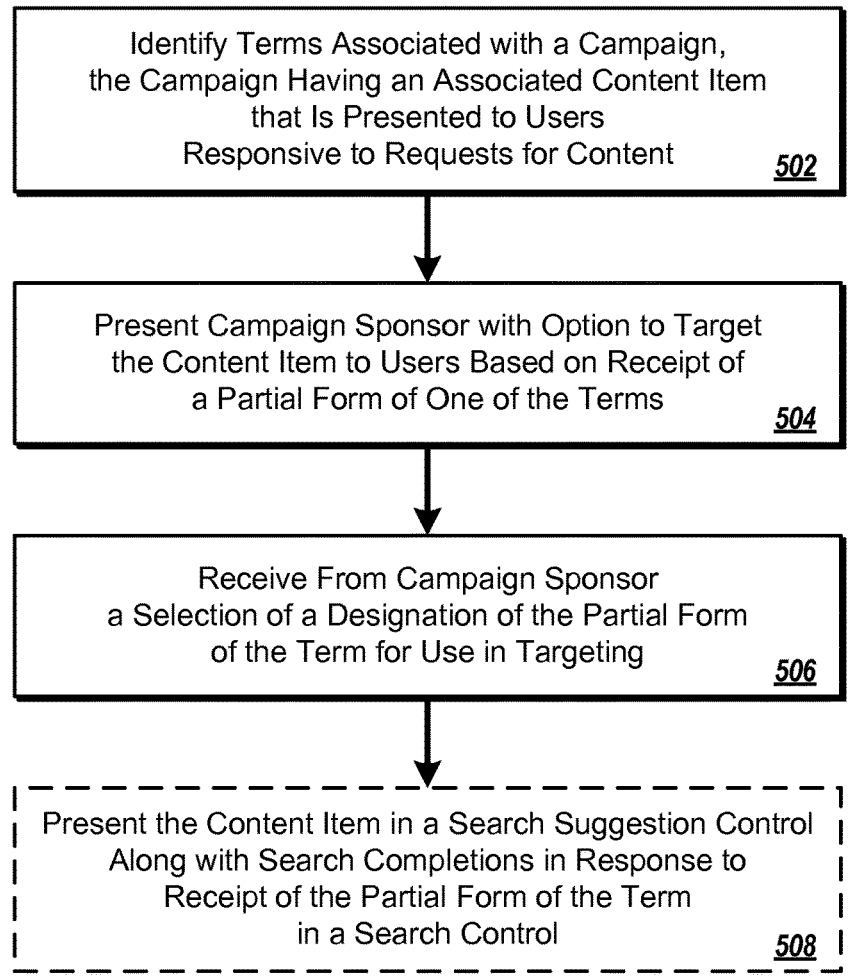
FIGS. 5 and 6 are flowcharts of example processes for presenting campaign sponsors with options for targeting content items to users based on receipt of partial terms.

FIG. 5 is a flowchart of an example process 500 for presenting campaign sponsors with options for targeting content items to users based on receipt of partial terms. In some implementations, the process 500 may be performed by the systems 100 and/or 200, and will be described as such for the purpose of clarity. Briefly, the process 500 includes identifying terms (e.g., keywords) associated with a campaign, presenting a campaign sponsor with options for targeting content items to users based on receipt of a partial term, receiving from the campaign sponsor a selection of a designation of a partial term for use in targeting, and optionally presenting a content item in a search suggestion control along with search completions in response to receipt of the partial term in a search control.

One or more terms (e.g., keywords) associated with a campaign can be identified (502). Referring to FIG. 2, for example, the keyword identifier 212 can identify one or more keywords associated with a campaign (e.g., an advertising campaign) of the campaign sponsor 240. For example, the campaign sponsor 240 may be an entity such as an organization, business, or individual. In the present example, the campaign sponsor 240 (e.g., "Example Motors", an automobile dealership) may have an ongoing campaign for presenting content items (e.g., the content item 260a) to users responsive to requests for content by users. In some implementations, one or more keywords may be received from a campaign sponsor. For example, a representative (e.g., the user 204a) of the campaign sponsor 240 may employ the interface 230a to provide the keyword phrase "Example Motors" or the distinct keywords "example" and "motors" to the content management system 210.

A campaign sponsor can be presented (504) with an option to target the content item to users based on receipt of a partial form of one of the one or more terms. In the present example, based on the keywords "example" and "motors", the targeting option provider 214 can provide the interface 230b including options to target the content item 260a to users based on receipt of various partial forms of the keywords "example" and/or "motors". In some implementations, a partial form may be a word in a keyword phrase. For example, the keyword phrase "Example Motors" may be parsed into distinct keywords "example" and "motors". In some implementations, a partial form may include the first letter or the first few letters of a term. For example, the keyword "example" may include the partial forms "e", "ex", "exa", "exam", and so forth.

In some implementations, presenting a campaign sponsor with an option to target a content item to users may include presenting the sponsor with one or more controls for selecting one or more partial forms for targeting. Referring to FIG. 3, for example, the user interface 300 can include one or more controls 310 for selecting partial keyword forms for targeting. By selecting a control (e.g., a check box) associated with a particular partial form (e.g., "exa", "exam", etc.) of a keyword (e.g., "example"), for example, the campaign sponsor 240 can indicate that the content item 260a is to be targeted to users in response to receipt of the selected partial form.

In some implementations, suggestions for partial forms for targeting may be presented. For example, based on input received from the campaign sponsor 240 via controls 302 (keywords and/or phrases), 304 (websites), and 306 (filtering parameters), appropriate suggestions for keywords and partial keyword forms may be presented via the user interface 300. In some implementations, reach information and/or competition information may be presented for each partial form suggested. For example, the control(s) 312 for presenting estimated reach information may include an estimated number of impressions for a corresponding keyword and/or partial keyword for a particular time period (e.g., per hour, per day, per week, etc.). As another example, the control(s) 314 for presenting competition information may include an indication (e.g., a graphic, a numeric value, a monetary value, etc.) of a level of competition for a corresponding keyword and/or partial keyword in an estimated auction for having content items presented to users in response to receipt of the keyword or partial keyword form.

A selection of a designation of the partial form for use in targeting can be received (506) from a campaign sponsor. For example, the selection receiver 216 can receive one or more selections of keywords and/or partial keyword forms for use in targeting the content item 260a to users. In the present example, the campaign sponsor 240 may provide the partial keyword selections 244 (e.g., "exa" and "exam") to the content management system 210 via the interface 230c. In some implementations, receiving the selection may include receiving a bid to be associated with a partial form of a keyword. Referring to FIG. 4, for example, default bids and/or bids on particular keywords and/or partial keyword forms may be provided. For example, a representative of the campaign sponsor 240 may employ the user interface 400 to indicate that a bid of $0.25 is to be entered in an auction for having the content item 260a presented to system users in response to receipt of the keyword "example" and/or partial forms (e.g., the letter "e", the letters "ex", etc.) of the keyword.

In some implementations, the content item can optionally be presented (508) in a search suggestion control along with search completions in response to receipt of the partial form in a search control. For example, the content management system 210 can employ the keyword receiver 218 to receive keywords and partial forms of keywords, and can employ the content item provider 220 to provide one or more content items in response to the receipt. In the present example, the content item 260b can be presented in the search suggestions control 270, in response to receipt of the partial form "exa" of the keyword "example" in the search control 252a. Thus, for example, sponsored search suggestions may be presented along with potential search completions in a search suggestion control. Potential applications may include search suggestion interfaces for web searches, map searches, video searches, product searches, and other search types.

Figure 6:
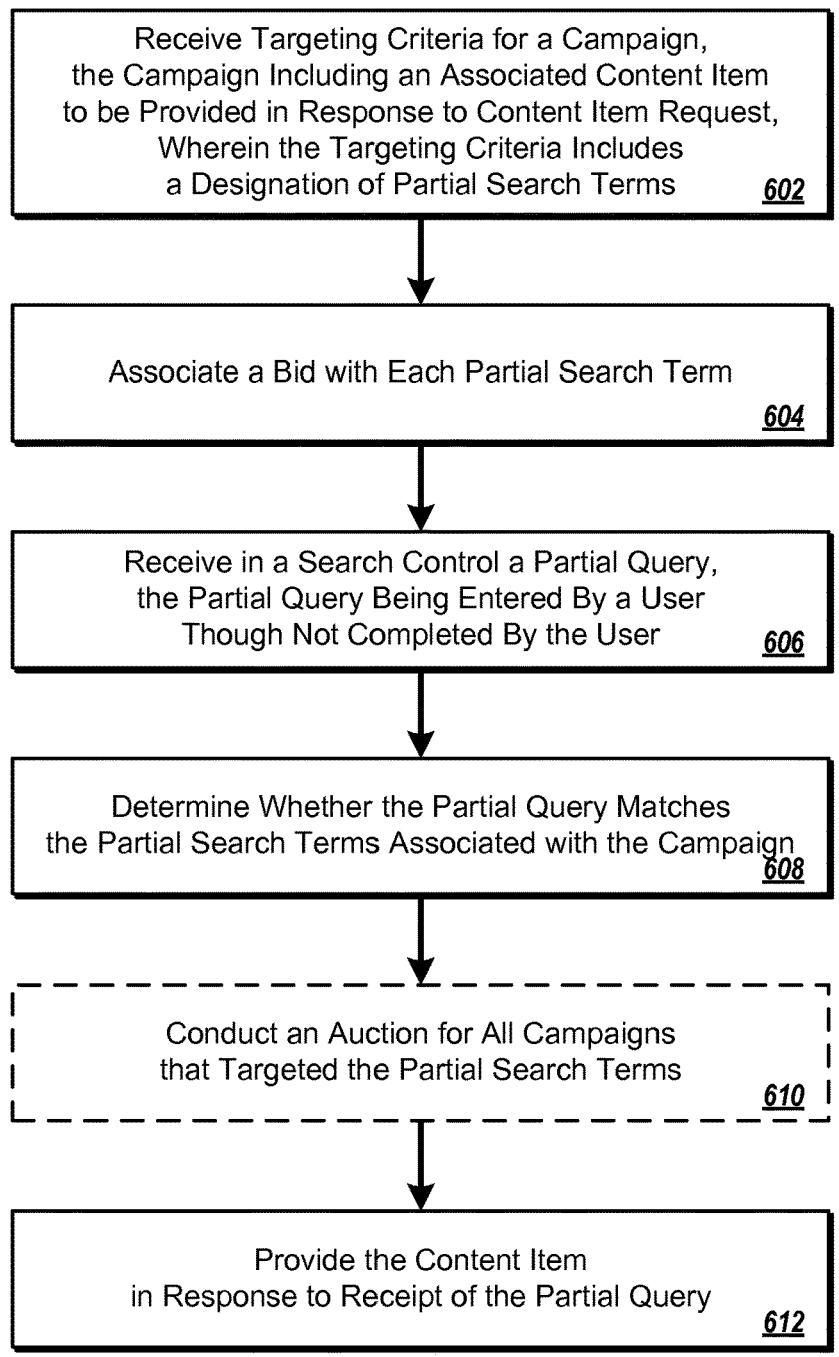

FIG. 6 is a flowchart of an example process 600 for presenting campaign sponsors with options for targeting content items to users based on receipt of partial terms. In some implementations, the process 600 may be performed by the system 100 and/or 200 and will be described as such for the purpose of clarity. Briefly, the process 600 includes receiving targeting criteria for a campaign, the targeting criteria including a designation of one or more partial search terms. The process 600 includes associating a bid with each partial search term, receiving in a search control a partial query, determining whether the partial query matches the partial search terms associated with the campaign, optionally conducting an auction for all campaigns that targeted the partial search terms, and providing the content item in response to receipt of the partial query.

Targeting criteria can be received (602) for a campaign. For example, the content management system 210 can receive targeting criteria for a campaign initiated and maintained by campaign sponsor 240. A campaign, for example, may include one or more content items (e.g., including text, images, video, audio, links, and other types of content) associated with the campaign, to be provided to a user in response to a content item request by the user. For example, a campaign (e.g., an advertising campaign) of the campaign sponsor 240 (e.g., "Example Motors") may include the content item 260a, including text (e.g., "Example Motors"), a web link (e.g., www.example.com), and a favicon (e.g., an automobile icon) associated with the campaign sponsor 240. Targeting criteria, for example, may include a designation of one or more partial search terms. In the present example, partial search terms may include partial forms (e.g., a letter, a few letters, etc.) of the keywords "example", "motors", "automobiles", and other potentially related terms and phrases. In some implementations, targeting criteria may include criteria related to system users and/or devices. For example, content items may be targeted to users associated with certain demographic attributes, profile characteristics, language preferences, and/or may be targeted to devices associated with certain locations and/or of certain types (e.g., mobile devices, etc.).

A bid can be associated (604) with each partial search term. For example, the content management system 210 can associate a bid from a campaign sponsor with one or more of the partial terms included in the keywords "example", "motors", and/or "automobiles". Each of the bids, for example, may be subsequently used in an auction between multiple campaign sponsors for having sponsored content items (e.g., the content item 260a) presented to users in response to receiving partial queries matching one or more of the partial search terms.

In a search control, a partial query can be received (606), the partial query being entered by a user though not completed by the user. For example, the user 204b may use the client device 202b to access the search page 250a, and may begin entering text (e.g., by typing) into the search control 252a. As text is entered (e.g., as the text is typed into the search control), for example, the search page 250a may automatically submit partial queries to the computing server(s) 208b (the search system). Thus, the computing server(s) 208b may receive and evaluate partial queries as the queries are entered by users, and may generate suggested query completions based on historical usage information.

A determination (608) can be made of whether the partial query matches the partial search terms associated with the campaign. For example, the content management system 210 can receive the partial query "exa" and can determine that the partial query matches a partial search term (e.g., a partial form of the keyword "example") associated with a campaign maintained by campaign sponsor 240.

In some implementations, an auction can be conducted (610) for all campaigns that targeted the partial search terms. For example, the content management system 210 can conduct an auction between various content sponsors who may have bid on the partial search term "exa". During the auction, for example, the content management system 210 can evaluate bids and associated quality scores for each campaign, and can determine one or more auction winners. Quality scores, for example, may be based on historical click rates of content items, campaigns, and/or campaign sponsors, and other suitable factors.

The content item can be provided (612) in response to receipt of the partial query. In the present example, the content item 260b may be provided within the search suggestion control 270 (along with suggested search completions 272) included on the search page 250b, for presentation to the user 204b via the client device 202b. For example, the content management system 210 may have identified the campaign of the campaign sponsor 240 as winning an auction between multiple campaigns for providing content items to users in response to receiving the partial query "exa".

Figure 7:
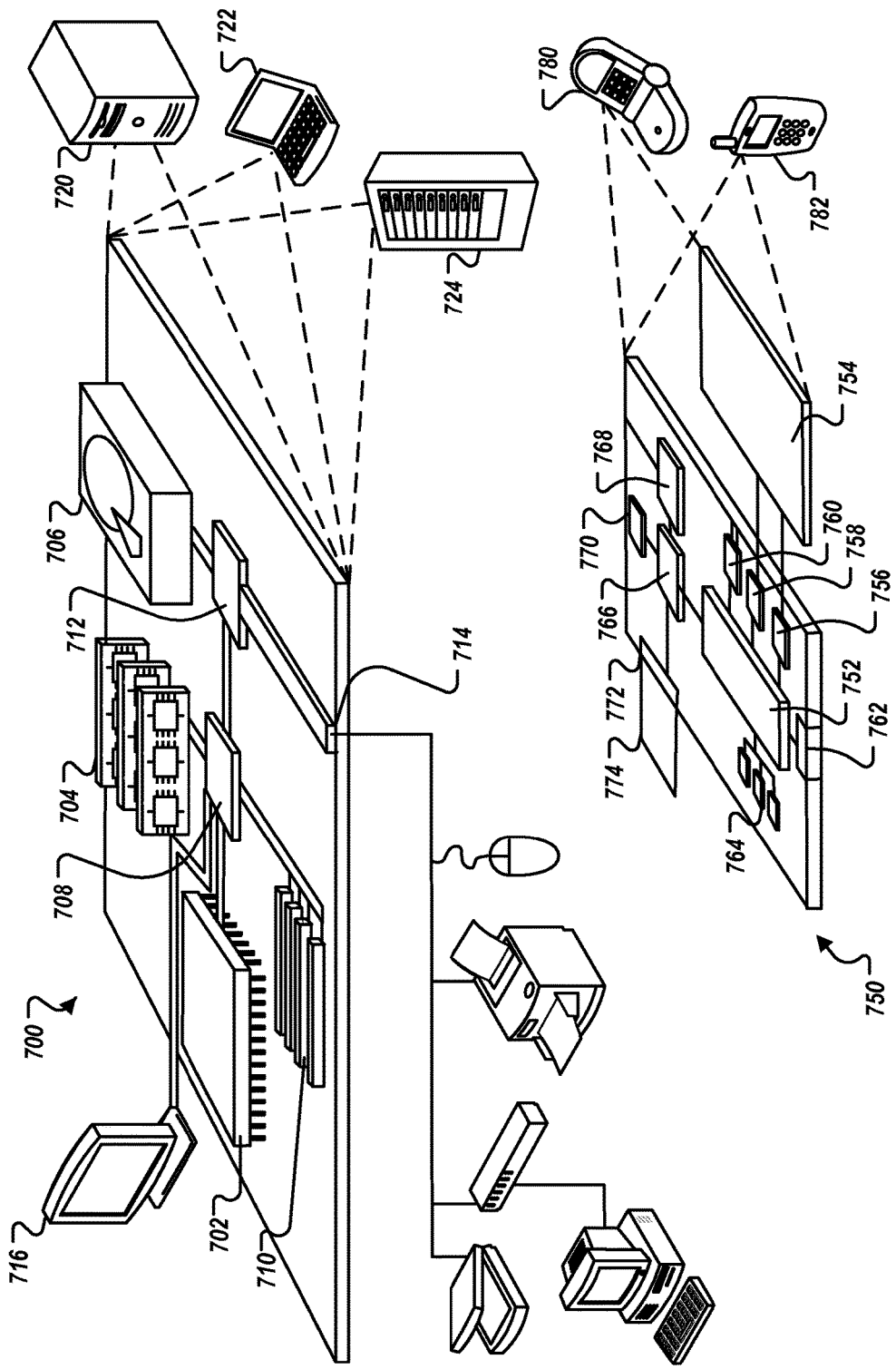
FIG. 7 shows an example of a computer device and a mobile computer device that can be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    identifying one or more terms associated with a campaign, the campaign having an associated content item that is presented to users responsive to requests for content;
    presenting a campaign sponsor with an option to target the associated content item to users based on receipt of a partial form of one of the one or more terms, wherein presenting the campaign sponsor with the option comprises:
        (i) presenting the campaign sponsor with one or more controls for selecting a type of computing device from multiple different types of computing devices, wherein the type of computing device is associated with requests for content for a subset of users;
        (ii) receiving from the campaign sponsor a selection of a particular type of computing device;
        (iii) presenting the campaign sponsor with one or more controls for indicating one or more user filtering parameters, wherein the user filtering parameters include user languages and user locations;
        (iv) receiving from the campaign sponsor a selection of one or more of the one or more user filtering parameters;
        (v) presenting suggestions for one or more partial forms of the one or more identified one or more terms;
        (vi) determining, by one or more processors, and presenting estimated reach information for each of the partial forms suggested, the estimated reach information comprising an estimated number of impressions for a respective partial form over a predetermined time period for the particular type of computing device selected by the campaign sponsor, based on the one or more user filtering parameters selected by the campaign sponsor, wherein the estimated number of impressions in the estimated reach information is based at least in part on analyzing usage information derived from a query log to identify a frequency with which the respective partial form had been previously submitted by users of the particular type of computing device, the usage information including information associated with past user activity and with computing devices that users previously used to submit search queries;
        (vii) determining, by one or more processors, and presenting competition information for each of the partial forms suggested, the competition information comprising an indication of a level of competition in an auction for a respective partial form; and
        (viii) presenting a control for selecting one or more of the suggested partial forms; and
    receiving from the campaign sponsor a selection of a designation of a partial form of one of the identified one or more terms; and
    storing the selection of the designation of the partial form of one of the identified one or more terms, in association with the campaign and the associated content item for use in targeting.

2. The method of claim 1 wherein identifying one or more terms includes receiving the one or more terms from the campaign sponsor.

3. The method of claim 1 wherein receiving the selection includes receiving a bid to be associated with the partial form of one of the identified one or more terms.

4. The method of claim 1 wherein the partial form includes a first letter of one of the one or more terms.

5. The method of claim 1 wherein the partial form includes a first few letters of one of the one or more terms.

6. The method of claim 1 wherein the partial form is a word in a phrase.

7. The method of claim 1 further comprising presenting the associated content item in a search suggestion control along with search completions in response to receipt of the partial form of one of the one or more terms in a search control.

8. The method of claim 7 further comprising highlighting the partial form in the associated content item when presenting the associated content item to users.

9. A computer-implemented method comprising:
    presenting a campaign sponsor with an option to target a content item to users based on receipt of a partial query, wherein presenting the campaign sponsor with the option comprises:
        (i) presenting the campaign sponsor with one or more controls for selecting a type of computing device from multiple different types of computing devices, wherein the type of computing device is associated with requests for content for a subset of users;
        (ii) receiving from the campaign sponsor a selection of a particular type of computing device;
        (iii) presenting the campaign sponsor with one or more controls for indicating one or more user filtering parameters, wherein the user filtering parameters include user languages and user locations;
        (iv) receiving from the campaign sponsor a selection of one or more of the one or more user filtering parameters;
        (v) presenting suggestions for one or more partial search terms for one or more terms associated with a campaign, the campaign including the content item that is to be provided in response to a content item request;
        (vi) determining, by one or more processors, and presenting estimated reach information for each of the partial search terms suggested, wherein determining the estimated reach information comprises determining an estimated number of impressions for a respective partial search term over a predetermined time period for the particular type of computing device selected by the campaign sponsor, based on the one or more user filtering parameters selected by the campaign sponsor, wherein the estimated number of impressions in the estimated reach information is based at least in part on analyzing usage information derived from a query log to identify a frequency with which the respective partial form had been previously submitted by users of the particular type of computing device, the users having attributes that correspond to the one or more user filtering parameters, the usage information including information associated with past user activity and with computing devices that users previously used to submit search queries;

(vii) determining, by one or more processors, and presenting competition information for each of the partial search terms suggested, the competition information comprising an indication of a level of competition in an auction for a respective partial search term; and (viii) presenting a control for designating one or more of the suggested partial search terms;

receiving targeting criteria for the campaign, wherein the targeting criteria includes a designation of one or more partial search terms;

associating a bid with each of the partial search terms designated in the targeting criteria;

receiving in a search control the partial query, the partial query being entered by a user though not completed by the user;

determining that the partial query matches the one or more partial search terms for one or more terms associated with the campaign; and providing the content item in response to receipt of the partial query.

10. The method of claim 9 further comprising conducting an auction for all campaigns that targeted the partial search terms including evaluating bids and associated quality scores for the campaign and presenting a content item from one or more winning campaigns in a search suggestion control responsive to receipt of the partial query.

11. A non-transitory computer storage medium encoded with a computer program, the computer program comprising instructions that when executed by one or more computers cause the one or more computers to perform operations comprising:

identifying one or more terms associated with a campaign, the campaign having an associated content item that is presented to users responsive to requests for content;

presenting a campaign sponsor with an option to target the associated content item to users based on receipt of a partial form of one of the one or more terms, wherein presenting the campaign sponsor with the option comprises:

(i) presenting the campaign sponsor with one or more controls for selecting a type of computing device from multiple different types of computing devices, wherein the type of computing device is associated with requests for content for a subset of users;

(ii) receiving from the campaign sponsor a selection of a particular type of computing device;

(iii) presenting the campaign sponsor with one or more controls for indicating one or more user filtering parameters, wherein the user filtering parameters include user languages and user locations;

(iv) receiving from the campaign sponsor a selection of one or more of the one or more user filtering parameters;

(v) presenting suggestions for one or more partial forms of the one or more identified one or more terms;

(vi) determining and presenting estimated reach information for each of the partial forms suggested, the estimated reach information comprising an estimated number of impressions for a respective partial form over a predetermined time period for the particular type of computing device selected by the campaign sponsor, based on the one or more user filtering parameters selected by the content sponsor, wherein the estimated number of impressions in the estimated reach information is based at least in part on analyzing usage information derived from a query log to identify a frequency with which the respective partial form had been previously submitted by users of the particular type of computing device, the usage information including information associated with past user activity and with computing devices that users previously used to submit search queries;

(vii) determining and presenting competition information for each of the partial forms suggested, the competition information comprising an indication of a level of competition in an auction for a respective partial form; and (viii) presenting a control for selecting one or more of the suggested partial forms; and receiving from the campaign sponsor a selection of a designation of a partial form of one of the identified one or more terms; and presenting the associated content item in a search suggestion control along with search completions in response to receipt of the selection of the designation of the partial form of one of the identified one or more terms in a search control.

12. A system comprising:

a processor in data communication with a storage system, the storage system storing instructions executable by the processor for performing operations of a keyword identifier, a targeting option provider, and a targeting selection receiver;

wherein the keyword identifier is enabled to identify one or more terms associated with a campaign, the campaign having an associated content item that is presented to users responsive to requests for content;

wherein the targeting option provider is enabled to present a campaign sponsor with an option to target the associated content item to users based on receipt of a partial form of one of the one or more terms, wherein presenting the campaign sponsor with the option comprises:

(i) presenting the campaign sponsor with one or more controls for selecting a type of computing device from multiple different types of computing devices, wherein the type of computing device is associated with requests for content for a subset of users;

(ii) receiving from the campaign sponsor a selection of a particular type of computing device;

(iii) presenting the campaign sponsor with one or more controls for indicating one or more user filtering parameters, wherein the user filtering parameters include user languages and user locations;

(iv) receiving from the campaign sponsor a selection of one or more of the one or more user filtering parameters;

(v) presenting suggestions for one or more partial forms of the one or more identified one or more terms;

(vi) determining and presenting estimated reach information for each of the partial forms suggested, the estimated reach information comprising an estimated number of impressions for a respective partial form over a predetermined time period for the particular type of computing device selected by the campaign sponsor, based on the one or more user filtering parameters selected by the campaign sponsor, wherein the estimated number of impressions in the estimated reach information is based at least in part on analyzing usage information derived from a query log to identify a frequency with which the respective partial form had been previously submitted by users of the particular type of computing device, the usage information including information associated with past user activity and with computing devices that users previously used to submit search queries;

(vii) determining and presenting competition information for each of the partial forms suggested, the competition information comprising an indication of a level of competition in an auction for a respective partial form; and (viii) presenting a control for selecting one or more of the suggested partial forms; and wherein the targeting selection receiver is enabled to receive from the campaign sponsor a selection of a designation of a partial form of one of the identified one or more terms, and to store the selection of the designation of the partial form of one of the identified one or more terms, in association with the campaign and the associated content item for use in targeting.

13. The system of claim 12 further comprising a keyword receiver, wherein the keyword receiver is enabled to receive the partial form of one of the one or more terms.

14. The system of claim 13 further comprising a content item provider, wherein the content item provider is enabled to present the associated content item along with suggested search completions.

15. The method of claim 1, further comprising:
presenting the campaign sponsor with one or more controls for indicating a website; and
receiving from the campaign sponsor an indication of the website;
wherein identifying one or more terms associated with the campaign comprises extracting one or more terms from the website.

16. The method of claim 1, wherein determining the estimated reach information comprises determining the estimated number of impressions over the predetermined time period for a respective partial form for the particular type of computing device selected by the campaign sponsor, based on the one or more user filtering parameters selected by the campaign sponsor.

* * * * *